US011955093B2

(12) United States Patent
Demski et al.

(10) Patent No.: US 11,955,093 B2
(45) Date of Patent: Apr. 9, 2024

(54) METHOD OF DISPLAYING WORK VEHICLE INFORMATION IN A FIELD AND SYSTEM THEREOF

(71) Applicant: DEERE & COMPANY, Moline, IL (US)

(72) Inventors: Nathan R. Demski, Durango, IA (US); Brian M. Huenink, Cedar Grove, WI (US); Eric A. Keen, Manhattan, KS (US)

(73) Assignee: DEERE & COMPANY, Moline, IL (US)

( * ) Notice: Subject to any disclaimer, the term of this patent is extended or adjusted under 35 U.S.C. 154(b) by 464 days.

(21) Appl. No.: 17/193,649

(22) Filed: Mar. 5, 2021

(65) Prior Publication Data
US 2021/0402917 A1 Dec. 30, 2021

Related U.S. Application Data

(60) Provisional application No. 63/046,041, filed on Jun. 30, 2020.

(51) Int. Cl.
*G09G 3/34* (2006.01)
*B60K 35/00* (2006.01)
(Continued)

(52) U.S. Cl.
CPC .............. *G09G 3/34* (2013.01); *B60K 35/00* (2013.01); *B60Q 1/24* (2013.01); *B60Q 1/543* (2022.05);
(Continued)

(58) Field of Classification Search
CPC .............. B60K 35/00; B60K 2370/152; B60K 2370/178; G07C 5/0808; B60Q 2400/20;
(Continued)

(56) References Cited

U.S. PATENT DOCUMENTS 10,134,280 B1 * 11/2018 You ................... B60Q 1/525
10,195,980 B2  2/2019 Widdowson et al.
(Continued)

FOREIGN PATENT DOCUMENTS

DE    19839881 A1    3/2000
DE    102014206801 A1    11/2015
DE    102015104928 A1    10/2016

OTHER PUBLICATIONS

Demski et al., Implement Recognition Lighting, U.S. Appl. No. 63/017,978, filed Apr. 30, 2020, 88 pages.
(Continued)

*Primary Examiner* — Hunter B Lonsberry
*Assistant Examiner* — Helen Li
(74) *Attorney, Agent, or Firm* — Taft Stettinius & Hollister LLP; Stephen F. Rost

(57) ABSTRACT

An agricultural work vehicle for operating in a field includes a chassis, a cab mounted to the chassis for an operator to control the work vehicle, a controller for controlling operation of the work vehicle, a lighting system of the work vehicle comprising at least one array field light, and a light control module disposed in electrical communication with the controller. The light control module operably controls the at least one array field light. The controller transmits a signal to the light control module indicative of information about the work vehicle. The at least one array field light projects the information onto the field at a location visible to the operator while operating the work vehicle.

20 Claims, 4 Drawing Sheets

(51) Int. Cl.
*B60Q 1/24* (2006.01)
*B60Q 1/50* (2006.01)
*G07C 5/08* (2006.01)
*G09G 3/00* (2006.01)
*B60K 35/22* (2024.01)
*B60K 35/28* (2024.01)

(52) U.S. Cl.
CPC ........... *G07C 5/0808* (2013.01); *G09G 3/001* (2013.01); *B60K 35/22* (2024.01); *B60K 35/28* (2024.01); *B60K 2360/178* (2024.01); *B60Q 2300/112* (2013.01); *B60Q 2400/20* (2013.01); *B60Q 2400/50* (2013.01)

(58) Field of Classification Search
CPC .... B60Q 1/543; B60Q 1/24; B60Q 2300/112; B60Q 2400/50; B60Q 2400/00; B60Q 1/00; B60Q 2800/20; G09G 3/34; G09G 3/001
See application file for complete search history.

(56) References Cited

U.S. PATENT DOCUMENTS

| | | |
|---|---|---|
| 10,538,195 B2 | 1/2020 | Fritz et al. |
| 2014/0025264 A1* | 1/2014 | Meagher .............. A01D 46/082 56/16.6 |
| 2018/0279539 A1 | 10/2018 | Wagner |
| 2018/0297470 A1* | 10/2018 | Kim ........................ B60Q 1/085 |
| 2020/0039421 A1* | 2/2020 | Gröne ................. B60Q 1/0483 |
| 2020/0391760 A1* | 12/2020 | Reschke ............... B60W 50/14 |

OTHER PUBLICATIONS

Schott et al., Method for Communication between Two Utility Vehicles, unpublished U.S. Appl. No. 17/155,722, filed Jan. 22, 2021, 11 pages.

German Patent and Trademark Office, Munich; German Search Report with Machine Translation; pp. 1-16; Date: Feb. 11, 2022.

* cited by examiner

METHOD OF DISPLAYING WORK VEHICLE INFORMATION IN A FIELD AND SYSTEM THEREOF

RELATED APPLICATIONS

This application claims the benefit of U.S. Provisional Patent Application Ser. No. 63/046,041, filed Jun. 30, 2020, the disclosure of which is hereby incorporated by reference in its entirety.

FIELD OF THE DISCLOSURE

The present disclosure relates to a lighting system of a work vehicle, and in particular, to using the lighting system to project information in a field.

BACKGROUND

Lighting systems on vehicles are well known and perform numerous tasks. In some instances, conventional lighting systems for on-road vehicles may adjust lighting levels on the basis of a travel path or intended travel path of a vehicle. These lighting systems can offer guidance to an operator who is controlling the steering and operation of the vehicle.

In some ways, these conventional lighting systems are being used similarly in off-road vehicles such as agricultural machines, construction or industrial machines, and forestry machines. As technology continues to evolve and is added to these types of machines, additional in-cabin lights and controls are added for operation by the operator. These additional lights and controls can cause an operator to focus more attention on these controls rather than on a field, on an implement, or areas around the machine. The continuous back-and-forth between monitoring the controls and lights within the cab of the machine and the field being operated in can cause fatigue to the operator and possible errors in the field operation.

It is therefore desirable to provide a more operator-friendly method and system of displaying information related to the machine and operation to the operator without causing the operator to continuously monitor displays and the like in the cab of the machine.

SUMMARY

In one embodiment of the present disclosure, an agricultural work vehicle for operating in a field includes a chassis; a cab mounted to the chassis and including a work space for an operator to control the work vehicle; a controller for controlling operation of the work vehicle; a lighting system of the work vehicle comprising at least one array field light; a light control module disposed in electrical communication with the controller, the light control module configured to operably control the at least one array field light; wherein, the controller transmits a signal to the light control module indicative of information about the work vehicle; further wherein, the at least one array field light projects the information onto the field at a location visible to the operator while operating the work vehicle.

In another embodiment, a method of communicating information to an operator of an agricultural work vehicle includes operating the work vehicle in a forward direction in a field; providing the work vehicle with a cab for an operator to control the work vehicle, a controller, a lighting system including a array field light, and a light control module; receiving a signal by the controller indicative of information about the work vehicle; communicating the signal by the controller to the light control module; commanding the array field light to display the information; and projecting with the array field light the information in the forward direction onto the field at a location visible to the operator positioned in the cab.

In a further embodiment, a lighting system of a work vehicle operating in a field includes a light control module; a plurality of high-definition pixel LED field lights coupled at different locations to the work vehicle, the plurality of high-definition pixel LED field lights operably controlled by the light control module; wherein, a first high-definition pixel LED field light of the plurality of high-definition pixel LED field lights receives a signal from the light control module indicative of information to display for an operator of the work vehicle; wherein, the first high-definition pixel LED field light projects the information onto the field at a location in front of the work vehicle, the information being visible to the operator positioned in a cab of the work vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
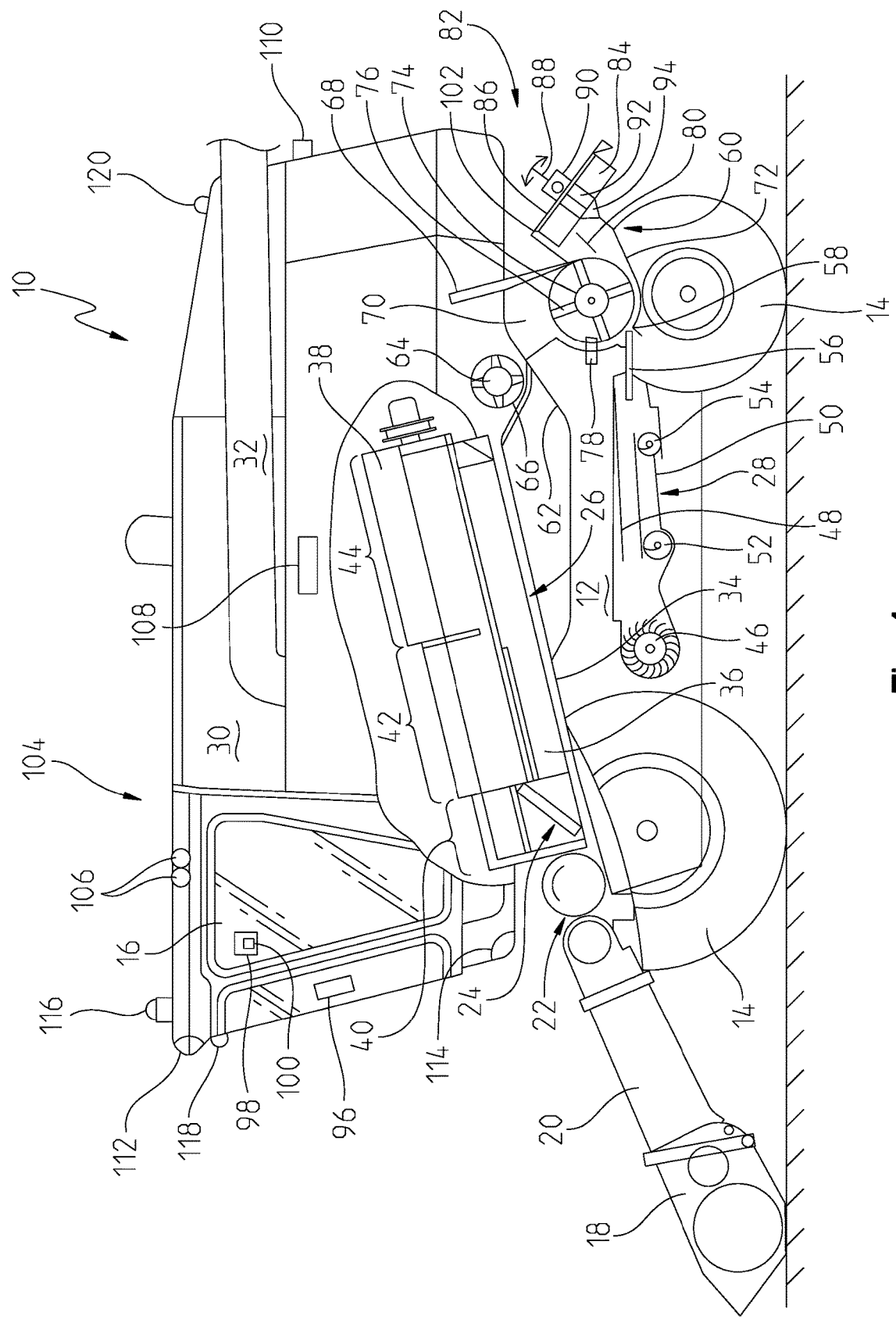
FIG. 1 is a partial section of a side view of an agricultural vehicle with a lighting system according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field as will be described below with reference to FIGS. 3 and 4.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. In one example, each of the plurality of field lights may comprise a LED array field light. Other technology besides LED may be used for the field lights. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. For instance, the light control module selectively operates both of a first array field light and a second array field light to project information simultaneously onto the field. One or more of the field lights can be activated individually and varied in terms of their luminous intensity by the vehicle controller 222 for adapting the emission characteristic or light intensity In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
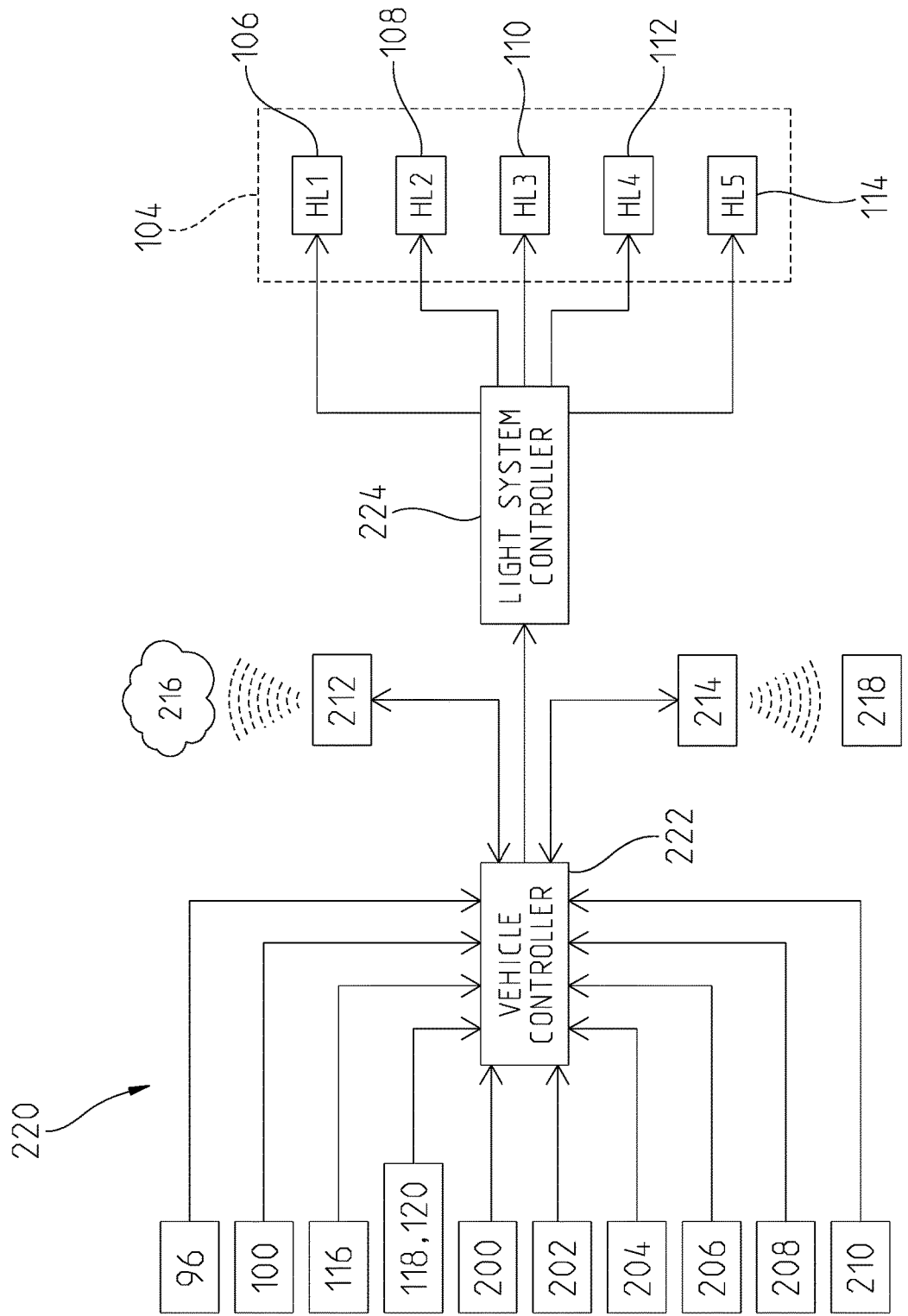
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to the other vehicle, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. The camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles in the field or on a roadway during transport.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206, comprising a speed sensor disposed in communication with the controller 222, may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

In conventional control systems, data and other information about the vehicle and/or implement may be presented to the operator on a display, dashboard, or other manner. In some cases, data may be displayed on a heads-up display (HUD) module on a glass window of the cab. In other instances, the operator may have to select between different screens in order to see certain data or information about the vehicle or implement. While HUD modules can allow an operator to maintain a forward-facing position, there are limitations to HUD modules. In some instances, data displayed via a HUD module can be distracting and cause an operator to lose focus on the field or implement being used.

Figure 3:
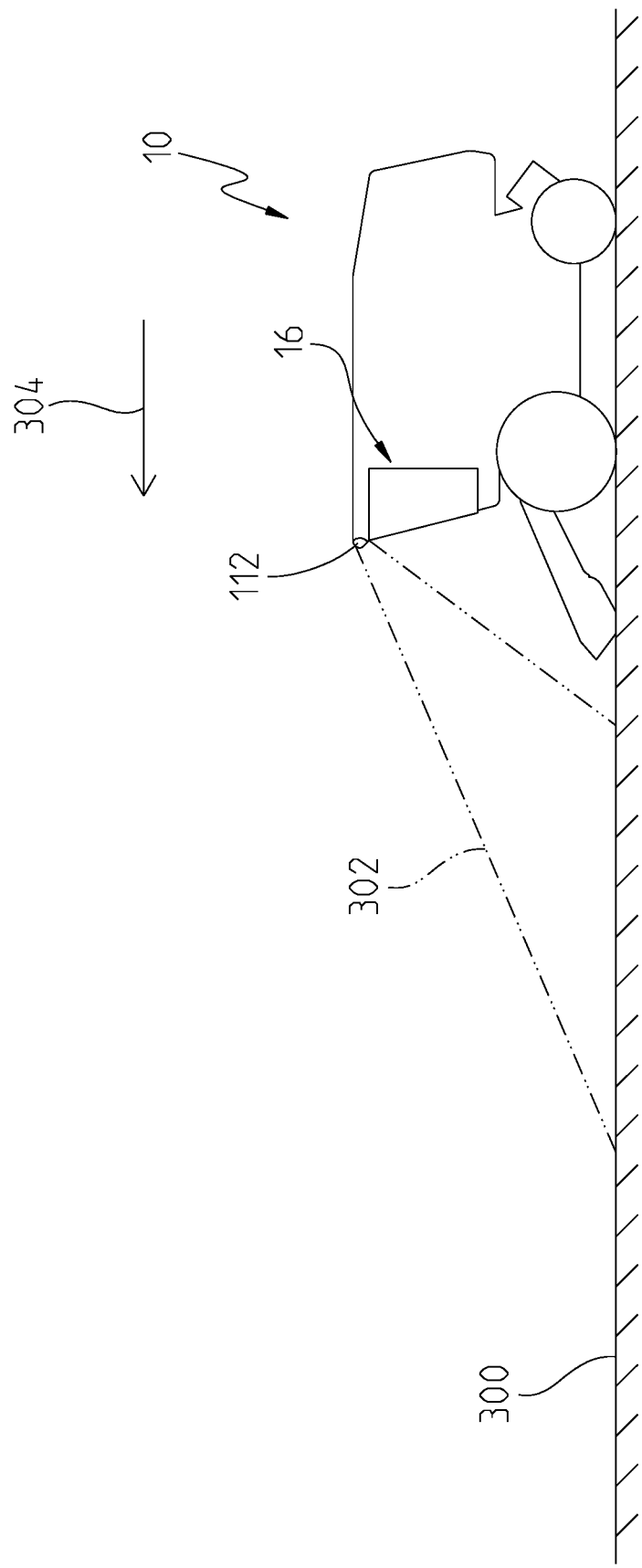
FIG. 3 is a schematic of an agricultural vehicle operating in a field with the lighting system of FIG. 1.

In order to overcome these distractions and allow the operator to maintain focus during vehicle or implement operation, the present disclosure provides a different manner for displaying information to the operator. In FIG. 3, an example of the work vehicle 10 is shown. Here, the work vehicle 10 may be a combine similar to that in FIG. 1. Alternatively, the vehicle 10 may include any off-road vehicle in the agricultural, construction, or forestry industries.

In any event, the work vehicle 10 in FIG. 3 is shown travelling in a forward work direction 304 along a field 300. The vehicle 10 may include a cab 16 where an operator is stationed for controlling the vehicle 10. The cab 16 may include a similar control system to that shown in FIG. 2. The control system, for example, may include an operator interface 96, a camera 100, and other sensors, etc. The vehicle 10 also may include the lighting system 104 described above, including an array field light 112 shown in FIG. 3 mounted to a front portion of the vehicle 10.

In the present embodiment of FIG. 3, the controller 222 may collect the aforementioned data and information from the different sensors, cameras, and the like and display this information to the operator during field operation. In particular, the controller 222 may communicate with the light system controller 224 for controlling the output of the array field light 112. The light system controller 224 may receive communications from the controller 222 and control the output of the array field light 112 to project or otherwise send a light emission 302 from the field light 112 onto the field 300 or ground in front of the vehicle 10. In one example, this array field light may include a high-definition (HD) LED or HD Pixel source LED illumination to be used for projecting information into the field.

The type of information to be projected onto the field may be limitless. For example, the field light 112 may project information such as field coverage, end rows, speed, direction, environmental conditions (e.g., wind speed, temperature, humidity, weather forecast), vehicle location in the field 300, location of a refill tank for seed, fertilizer, etc., and operation type (e.g., field mode or transport mode). This information may be emitted from the field light 112 onto the field in front of the work vehicle 10 or implement and such that the operator is able to remain focused on the field in front of the vehicle while also receiving the data and/or information.

Figure 4:
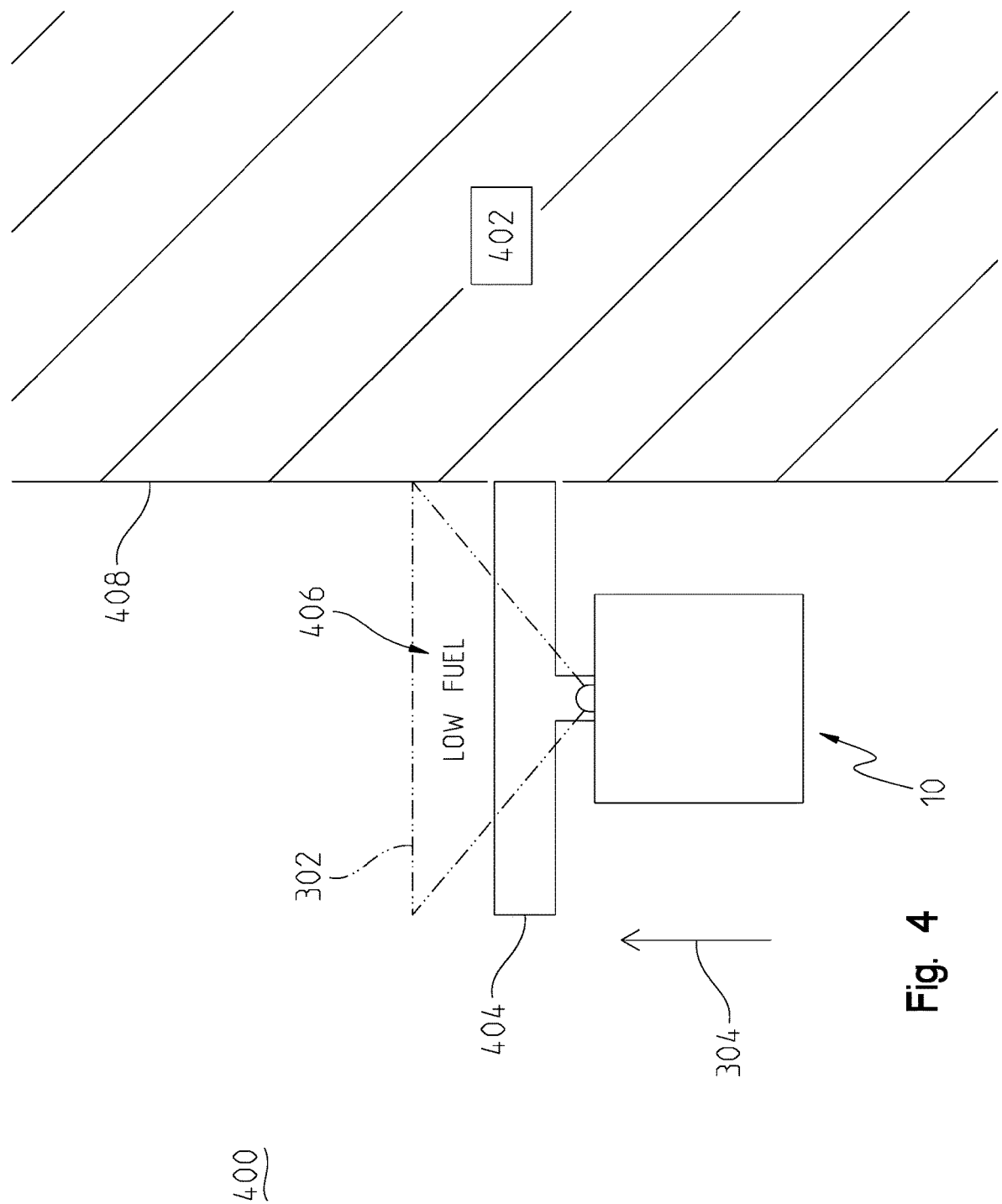
FIG. 4 is a schematic of the agricultural vehicle and lighting system of FIG. 3 operating in a field.

As shown in FIG. 4, another embodiment of the present disclosure is illustrated. Here, the work vehicle 10 is travelling in the forward travel direction 304 and includes an implement 404 attached to a front portion thereof. The implement 404 may be a cutter head 18 of a combine, for example. Alternatively, the implement 404 may comprise a planter implement with row units traversing a width of the field 400.

In this example, the work vehicle 10 is performing in a field mode in the field 400, but is operating adjacent to a non-field area 402. The non-field area 402 may be a roadway or other area which is not being worked by the work vehicle 10. A boundary 408 between the field 400 and the non-field area 402 may be communicated by the controller 222 via the field map input 202 to the light system controller 224 to alert the operator to this boundary. This information may be displayed in the cab of the vehicle, or alternatively it may be projected onto the field via the array field light 112 as shown in FIG. 3.

In FIG. 4, a representative illustration is provided whereby the array field light 112 can communicate an alert or diagnostic trouble code to the operator by projecting the information onto the field 400 in front of the vehicle 10 and implement 404. In this example, the communication is a low fuel warning 406 displayed clearly to the operator. The light system controller 224 may include logic from which it is controls the lighting system 104 to display the appropriate messages to the operator.

In FIGS. 3 and 4, the array field light 112 is shown on the front portion or end of the vehicle 10. In other embodiments, there may be additional array field lights located at different portions or ends of the vehicle.

In one embodiment, the array field light 112 may be operably controlled to display messages in the field for the operator only when the vehicle is operating in a field operating mode, or field mode. This is contrast to when the vehicle 10 is in transport mode and may be travelling along a road, for example. The determination of whether the vehicle is in field or transport mode may be provided by the operation mode type input 208 of FIG. 2.

The control module 224 of the lighting system may receive the communications from the controller 222 and operably control individual pixel segments to project or display the messages to the operator onto the field as shown in FIG. 4. As a result, the operator maintains focus on the field in front of the vehicle 10 or implement 404 without turning to displays in the cab or elsewhere to determine operation or other information about the vehicle or implement.

In another example, the light control module 224 may adjust the light intensity such as dimming the individual lights or increasing the luminosity, particularly if using white lights or using the white color spectrum.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies are described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle for operating in a field, comprising:
   a chassis;
   a cab mounted to the chassis and including a work space for an operator to control the agricultural work vehicle;
   a controller for controlling operation of the agricultural work vehicle;
   a lighting system of the agricultural work vehicle comprising at least one array field light;
   a light control module disposed in electrical communication with the controller, the light control module configured to operably control the at least one array field light;
   a field map input disposed in communication with the controller, the field map input providing a layout of the field, wherein the at least one array field light projects the layout of the field onto the field;
   wherein, the controller transmits a signal to the light control module indicative of information about the agricultural work vehicle;
   further wherein, the at least one array field light projects the information onto the field at a location visible to the operator while operating the agricultural work vehicle.

2. The agricultural work vehicle of claim 1, wherein the at least one array field light comprises a high-definition pixel LED lighting module.

3. The agricultural work vehicle of claim 1, wherein the controller receives an input regarding a diagnostic trouble code, the at least one array field light projecting the diagnostic trouble code onto the field.

4. The agricultural work vehicle of claim 1, wherein the at least one array field light is mounted to a front portion of the cab or chassis.

5. The agricultural work vehicle of claim 1, further comprising a second array field light mounted to a rear portion of the work vehicle.

6. The agricultural work vehicle of claim 1, further comprising a second array field light mounted to a side portion of the agricultural work vehicle.

7. The agricultural work vehicle of claim 1, wherein the agricultural work vehicle operates in an operation type including at least a field mode and a transport mode, the at least one array field light projecting the information only in the field mode.

8. The agricultural work vehicle of claim 1, the field map input includes one or more of field boundaries, roadways, fences lines, or obstacles to avoid.

9. The agricultural work vehicle of claim 1, further comprising a speed sensor disposed in communication with the controller, the speed sensor configured to detect vehicle speed;
   wherein the at least one array field light projects the vehicle speed onto the field.

10. The agricultural work vehicle of claim 1, wherein the at least one array field light comprises a first array field light and a second array field light;
    further wherein, the light control module selectively operates either the first or second array field light to project information onto the field.

11. The agricultural work vehicle of claim 1, wherein the at least one array field light comprises a first array field light and a second array field light;
    further wherein, the light control module selectively operates both the first and second array field lights to project information simultaneously onto the field.

12. The agricultural work vehicle of claim 1, wherein the controller operably receives the signal from a remote location.

13. A method of communicating information to an operator of an agricultural work vehicle, comprising:
    operating the agricultural work vehicle in a forward direction in a field;
    providing the agricultural work vehicle with a cab for an operator to control the agricultural work vehicle, a controller, a lighting system including an array field light, and a light control module;
    receiving a signal by the controller indicative of information about the agricultural work vehicle and a field map input disposed in communication with the controller, the field map input providing a layout of the field;
    communicating the signal by the controller to the light control module;
    commanding the array field light to display the information; and
    projecting with the array field light the information in the forward direction onto the field at a location visible to the operator positioned in the cab.

14. The method of claim 13, wherein the array field light comprises a high-definition pixel LED lighting module.

15. The method of claim 13, wherein the projecting step comprises projecting information related to a diagnostic trouble code, vehicle speed, vehicle performance, or vehicle location in the field.

16. The method of claim 13, further comprising varying an illumination output of the array field light by the light control module.

17. The method of claim 13, wherein:
the agricultural work vehicle is operable in an operation type including at least a field mode and a transport mode;
the operating step is executed in the field mode;
the projecting step is executed in the field mode.

18. The method of claim 13, further comprising:
providing a second array field light;
controllably operating the second array field light by the light control module to display a second information; and
projecting with the second array field light the second information in the forward direction onto the field at a second location visible to the operator positioned in the cab.

19. The method of claim 18, further comprising controlling with the light control module the second array field light independently of the array field light.

20. A lighting system of a work vehicle operating in a field, comprising:
a light control module;
a plurality of high-definition pixel LED field lights coupled at different locations to the work vehicle, the plurality of high-definition pixel LED field lights operably controlled by the light control module;
wherein, a first high-definition pixel LED field light of the plurality of high-definition pixel LED field lights receives a signal from the light control module indicative of information to display for an operator of the work vehicle, wherein the information includes a field map input providing a layout of the field;
wherein, the first high-definition pixel LED field light projects the information onto the field at a location in front of the work vehicle, the information being visible to the operator positioned in a cab of the work vehicle.

* * * * *